June 14, 1932.  T. R. HARRISON  1,863,373
CONTROL METHOD AND APPARATUS
Filed Aug. 6, 1925  4 Sheets-Sheet 1

Fig. 1

Inventor
Thomas Randolph Harrison
By William A. Strauch
Attorney

Patented June 14, 1932

1,863,373

UNITED STATES PATENT OFFICE

THOMAS RANDOLPH HARRISON, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA

CONTROL METHOD AND APPARATUS

Application filed August 6, 1925. Serial No. 48,687.

The present invention relates to control methods and apparatus.

More particularly the invention relates to control methods and apparatus for controlling various conditions, such, for example, as the regulation of temperatures, gas pressures and mixtures, fuel quality, flame lengths, and like.

In carrying out the various operations and processes numerous controlling factors and determinable preliminary conditions govern the resulting values of later conditions, and frequently cause deviations from proper or desirable values in later controlling conditions. For example, in kilns and furnaces, the temperatures will vary with physical or chemical conditions or composition of the materials with which the kiln or furnace is charged, with the rate of charging, the thermal value of the fuel supply, flame qualities, admission of air currents, and other disturbing and governing preliminary conditions. In prior temperature control methods it has been the custom to adjust the fuel or heat supply in response to deviations from the desired conditions and the chief problem has been to provide adequate but not excessive corrective measures in response to a minimum variation from the desired conditions. Various more or less complicated methods have been developed to minimize this unavoidable variation from desired conditions, but in every case the corrective measure is established through departure from desired conditions and hence it is impossible to maintain accurately the desired conditions by these methods, though where the lag between heat supply and temperature element is negligible, these methods are usually satisfactory. As the temperature variation of the heat sensitive element which operates the controlling mechanism usually lags substantially behind the irregularity in surrounding conditions or qualities which operates to cause a variation from the desired conditions it follows that a departure from the desired conditions will have progressed substantially in some parts of the furnace, kiln, etc., or in the materials being treated therein, before the heat sensitive element is affected sufficiently to initiate corrective measures. Substantial further time is required before the departure becomes arrested and conditions can be returned to normal, thus if the heat sensitive element must register departure from normal in order to initiate corrective measures it is usually inevitable that an undesirably large deviation from the desired (normal) conditions will take place before the corrective measures can arrest the departure and reestablish the desired conditions.

I have discovered that in the case of continuous processes, or where a predetermined cycle of operations is to be controlled and where irregularities occur in surrounding conditions of charge, or conditions of fuel, air or other conditions, which irregularities would tend to produce departure from the desired conditions of the charge under treatment, it is possible to effect appropriate changes in rate of charge delivery, rate of heat supply, ratio of air and fuel, or other controlling conditions, operated in response to the variations of said surrounding conditions.

Accordingly an object of my invention is to provide methods and apparatus for putting such changes into effect automatically under the influence of the respective irregularities without excessive delay, thus forestalling the tendency of the irregularity to produce a departure from the desired conditions, and substantially preventing such departure. For example, when the fuel supplied to burners comprises the commercial gas of some localities, sudden variations occur in the heating value, flame lengths, and illuminating qualities of the gas. These variations are highly undesirable and frequently cause sudden changes in furnace and kiln and like operating conditions for which compensation must be made to avoid serious losses in various manufacturing processes, such for example as in the production of porcelain and the like. In accordance with the present invention, such variations in quality are caused to correct the fuel supply before they can cause substantial temperature, flame, heating value, or like changes. In like manner various operations in which physical effects occur in a chain, a fixed sequence, or cycle may be controlled automatically by variations in a preliminary condition or conditions occurring in the chain, sequence, or cycle before substantial deviations from later desired conditions can occur. In this way compensation for temperature, pressure, weather, densities, chemical compositions, or proportions of mixtures, and like changes may be effected in controlling various processes, reactions, and operations.

Another object of the invention is to provide methods and means for producing corrective measures under the influence of one or more various initial or governing conditions, and also methods and means for providing further corrective measures under the influence of the conditions which it is desired to control, whereby any inaccuracy in the first corrective measures or any variations in controlling conditions may be compensated.

A further object of the invention is to provide methods and apparatus for combining the action of the various corrective measures upon the same quantity, as fuel supply, when it is desirable to do so.

Still another object of the invention is to provide control methods and apparatus in which corrections of governing conditions are made in rapid steps of a predetermined amount proportional in number to the adjustment required to restore the desired conditions; and in which as the normal conditions are approached further corrections may be made to adjust the governing conditions to maintain the normal or desired conditions when reached.

Another object of the invention is to provide methods and apparatus for applying corrective measures under influence of the conditions which it is desired to control whereby such necessary corrective measures as have not been otherwise produced can be made with promptness and of appropriate magnitude in order to minimize the departure from desired conditions. It should be understood, however, that the necessity for the special features of this means for providing corrective measures under influence of the conditions to be controlled are not essential to combinations including such means. On the other hand, the use in combination with means for producing corrective measures under the influence of initial conditions will usually leave such small further corrections to be made that the simplest kind of controller according to departure from desired conditions will produce satisfactory results.

It is to be understood that in the combination of any or all of the various controls as above set forth may in accordance with my invention affect the controlling quantity, as for example, fuel gas quality and kiln temperature, by acting mutually on a single valve controlling the fuel gas being delivered to the kiln, or by affecting separate controlling conditions, as for example the gas quality controlling the gas pressure impressed upon a valve and the kiln temperature controlling the valve opening; or the gas quality could control an admixture of air with the gas while kiln temperature controls gas pressure acting on a valve, orifice, or other opening.

The control according to initial condition may operate to bring the initial condition to a predetermined value but preferably the initial conditions should be allowed to vary according to their tendencies and the agency producing the desired conditions, as for example fuel or heat supply should be adjusted in accordance with the actual value of the initial condition which is taking part in the control.

Still other objects of the invention are to provide methods and apparatus for controlling physical conditions such as temperatures, gas pressures and mixtures; burner flame lengths; to proportion mixtures of gases; and to condition gases in accordance with variations in quality of a fuel supply; to provide methods and apparatus for simultaneously or alternately controlling physical conditions in response to deviations from predetermined values and in response to variations in preliminary conditions which affect the conditions to be controlled; and to provide a novel valve control in which gas pressures are varied by varying the amounts of weights applied to a controlling device.

Still further objects of the invention will appear in the folowing detailed description of preferred embodiments of the invention and are such as may be attained by a utilization of the various principles and mechanisms hereinafter set forth in the various relations to which they are adaptable and as defined by the terms of the appended claims.

Figure 1:
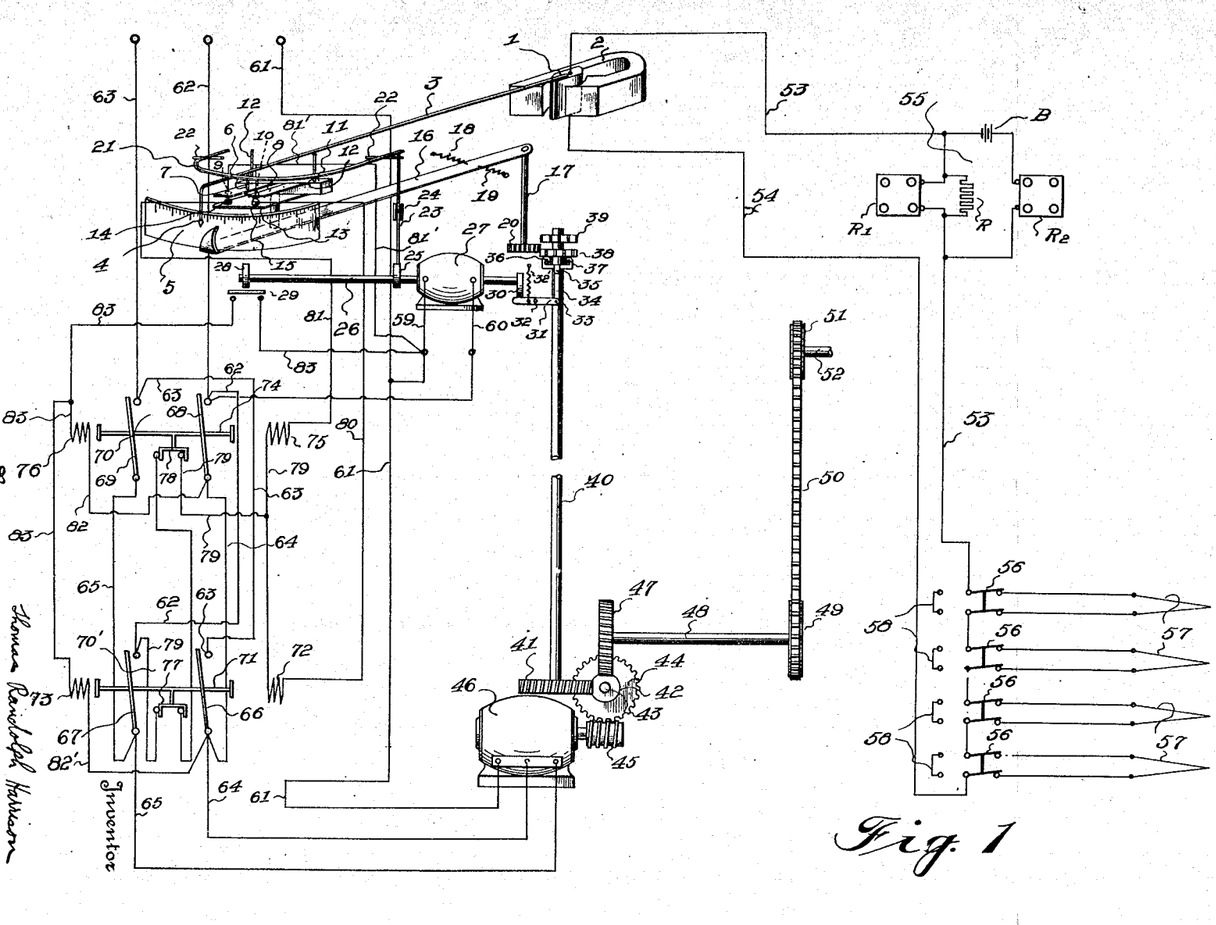
Figure 1 is a diagrammatic illustration of a form of control in accordance with temperature deviations.

In Figure 1 a contacting control galvanometer is provided comprising a movable coil 1 suspended between the poles of a permanent magnet 2. Secured to the coil 1 is a pointer 3 which is preferably provided with a downwardly extending portion 4 adapted to swing in front of a graduated scale 5 to indicate the deviation of the pointer from normal in the operation of the instrument. The pointer 3 is provided with a contact actuating extension 6 which is adapted to coact with carrying springs 7 and 8. Secured to the springs 7 and 8 are the electrical contacts 9 and 10. A block of insulating material 11 is provided to which are secured the springs 7 and 8 and the pointer limiting stops 12 and which is supported on a movable contact table 13. Secured to the movable contact table 13 are the contacts 14 and 15 which are adapted to be engaged by the contacts 9 and 10 in the operation of the device, as will more fully hereinafter appear. The table 13 is rigidly supported from and movable with a supporting arm 16 which may be provided with an upwardly extending pointer extension coacting with the scale 5. The arm 16 is secured to and rotatable with the vertical spindle 17. Springs 18 and 19 normally maintain the member 16 together with the contact table 13 in a central position. The spindle 17 is driven by a gear 20 as will more fully hereinafter appear. The pointer 3 is periodically lowered and raised under the control of a depresser bar 21 which is pivotally supported above the pointer at the points 22 in any suitable manner and is actuated by a vertically slidable rod 23 suitably guided at 24. The member 23 is actuated in its vertical movement by means of cam 25 against which the lower end thereof is held due to the weight of the parts or a light spring may be provided to hold the end of member 23 against the cam 25 if this is desired.

The cam 25 is mounted on a shaft 26 which is driven by the galvanometer actuating motor 27. Mounted on the shaft 26 is a cam 28, which actuates a switch member 29, and an escapement actuating cam 30. The cam 30 actuates an arm 31 pivotally supported at 32 with one end thereof preferably held in engagement with the cam 30 by means of a spring 32'. The opposite end of arm 31 is pivotally connected at 33 to a vertically extending link 34 which in turn is pivotally connected at 35 to a collar member 36. Secured to and rotatable in the collar member 36 is an escapement gear member 37 and upon which are secured the gears 38 and 39 adapted to mesh with the gear 20 and to drive the contact table. The gear 20 and the escapement gears 38 and 39 are separated as shown and are mutilated by removing alternate teeth in each gear so that as the cam 30 oscillates or shifts gears 38 and 39 alternately into engagement with the gear 20 the springs 18 or 19 will cause the contact table to be stepped backwards by an amount equal to the distance of one tooth for each reciprocation of the member 37. This is effected by removing the alternate teeth in such a manner from the gears 38 and 39 that the teeth on the gear 39 will be in line with the points where the teeth have been removed from the gear 38. The member 37 is keyed to and slidably mounted upon the shaft 40 so that as the shaft 40 is rotated, the gears will be driven to shift the contact table and as the member 37 slides vertically, due to the action of the cam 30, the contact table will be permitted to step backward toward zero position one step for each movement of the member 37.

The shaft 40 is driven by a worm gear 41 which in turn is driven by a worm 42 suitably mounted on a shaft 43. The shaft 43 is driven by a worm wheel or spiral gear 44 which in turn is driven by a worm or spiral gear 45 driven by motor 46. Gear 47 also meshes with worm or gear 42 and drives a shaft or spindle 48 which in turn drives a sprocket 49. Sprocket 49 drives chain 50 in turn driving a sprocket 51 to turn a valve or switch operating spindle 52, as will more fully hereinafter appear.

The galvanometer coil 1 is connected by means of conductors 53 and 54 through a potentiometer 55 embodying a battery B, fixed resistance R and the adjustable resistances $R_1$ and $R_2$, to the double pole, double throw switches 56 which in one position are adapted to connect the ardometers or thermocouples 57 in series with the conductors 53 and 54 and in the other position thereof are adapted to connect shunts 58 in series in the circuit and cut out the corresponding thermocouple. The galvanometer operating motor 27 is connected by means of the conductors 59 and 60 and the supply leads 61 and 62 to a source of electrical power. In the arrangement shown the motor 27 is a single phase alternating current motor of suitable construction and is connected across a single phase of the three-phase alternating current supply. It will be understood, however, that a suitable direct current motor may be substituted in obvious manner to drive the galvanometer parts, or other suitable electro-magnetic device, clockwork, or the like may be utilized.

The supply lead 61 of the three-phase electrical power source is permanently connected to one lead of the three-phase motor 46 and the remaining two leads of the motor 46 are adapted to be connected to either one of the remaining three-phase supply leads 62 and 63 by means of the conductors 64 and 65, switch blades 66, 67, 68 and 69 of the motor reversing switches 70' and 70. Blades 66 and 67 are secured to and actuated by a member 71 which in turn is actuated by the closing and opening coils 72 and 73. Blades 68 and 69 of the switch 70 are actuated by the member 74, which in turn is actuated by the closing and opening coils 75 and 76. Secured to and operated by members 71 and 74 are the auxiliary circuit closing members 77 and 78. Circuit closing members 77 and 78 in the open position of the switches 70' and 70 close break points in the conductor 79. Conductor 79 is connected at one end to the power lead 62 of the three phase supply lines, and at its other end is connected to one terminal of each of the closing coils 72 and 75. The other terminals of the closing coils 72 and 75 are connected by means of conductors 80 and 81 to the galvanometer contacts 15 and 14 arranged to cooperate with contacts 10 and 9 which in turn are connected to the power supply lead 61 by conductors 81′ and 59. The opening coils 73 and 76 have one terminal thereof connected by means of the conductors or leads 82′ and 82 to the lead 64 and the switch blades 66 and 68 respectively and have their other terminals connected by means of the conductor 83 through the switch member 29, when closed, and lead 59 to the three-phase power lead 61.

The form of apparatus so far described has in practice been applied to the regulation and maintenance of constant temperature conditions in a kiln for the manufacture of porcelain, but it will be understood that the apparatus may be applied to various other devices where a constant temperature is desirable. The thermocouples 57 are located at spaced points along the zone where the temperature is to be regulated and are connected in series so that a sensitive apparatus is provided with which the temperatures are controlled in accordance with the average temperature at the junction points of all of the thermocouples. It will be understood, however, that any usual arrangement of thermocouples may be provided. The potentiometer 55 is adjusted in such a manner that with temperature conditions at the thermocouples at the value which it is desired to maintain the galvanometer coil is positioned so that pointer 3 is in normal or zero position. Motor 27 rotates the shaft 26 continuously so that the cam 25 actuates the depressor bar 21 to periodically raise and lower the pointer 3. With the galvanometer in zero position the member 6 will move vertically between the contact springs 7 and 8 so that neither of the sets of contacts 9 and 14 or 10 and 15 will be closed.

When the temperature at the thermocouples drifts away from the predetermined normal temperature condition a deflection in the galvanometer will be produced with the result that the pointer 3 will be shifted either to the left or to the right position and extension 6 will be positioned over the spring 7 or 8 in accordance with the direction of the deflection of the needle or pointer. Assuming that the deflection is produced by a drop in temperature at the couples and is to the left in Fig. 1, as the depressor bar 21 moves downward, contact 9 will be forced into engagement with the contact 14 and an energizing circuit will be completed across a single-phase of the three-phase supply from conductor 61 through conductors 59 and 81′, contacts 9 and 14, conductor 81, the closing coil 75 of the switch 70, conductor 79, auxiliary switch members 78 and 77 of switches 70 and 70′ to the three-phase supply lead 62. Coil 75 energizes, closes the switch 70, and completes a circuit from the power leads 62 and 63 through the switch blades 68 and 69 to the leads 64 and 65 respectively of the motor 46. As switch 70 closes the motor circuit the energizing circuit for the closing coil is interrupted by the movement of the circuit closing member 78 to the right in switch 70 with the resulting opening of the conductor 79. Motor 46 starts into rotation and drives the shaft 48 in a direction to increase the fuel supply by rotating the valve spindle 52 in the proper direction. At the same time the motor 46 drives the shaft 40 which through the gear 38 will drive the pinion 20 to cause the rotation of the contact table 13 in the direction of the deflection of the galvanometer needle.

As the movement of the shaft 26 continues in its cycle of operations and after a predetermined amount of rotation of shaft 48 has occurred the cam 28 will close the switch 29 and will complete an energizing circuit from conductor 61 through conductors 59 and 83, switch 29, coil 76 of the switch 70, conductor 82 to the switch blade 68 and the power lead 62. Coil 76 will energize and will open the switch 70 which in turn will cut off the power supply from the motor 46 and cut off the energizing current from the coil 76. The motor 46 will then come to rest, the depressor bar will be on its upward movement, and cam 30 will cause the member 37 to reciprocate on the shaft 40. As reciprocating movement of the member 37 occurs the spring 19 will shift the contact table back a distance of one tooth of the gear 20. A plurality of return steps of the contact table under control of the escapement mechanism are required to effect the return thereof to zero or normal position. If the galvanometer deflection is such at the end of the first correcting step that the contact spring 7 is positioned beneath the pointer extension 6, when the bar depresses the pointer 3 in the next cycle of operations contacts 9 and 14 are again closed, the motor 46 will be started into operation to take a further step and the contact table 13 will be rotated still further to the left in Figure 1. As the fuel supply is increased sufficiently the temperatures at the couples will rise and the galvanometer pointer will start to return to the normal or zero position. When the extension 6 of the pointer is positioned between the springs 7 and 8 no further operation of motor 46 will occur. The motor 27 will continue to operate the escapement, however, causing the table 13 to return to normal. The rate of return of the contact table 13 is controlled by the escapement mechanism to be suitably related to the temperature recovery after a correction in the fuel supply has been made. If the temperature returns to normal at such a rate that the galvanometer pointer and needle return to normal at equal rates no further correction will be made until a further deviation occurs.

When the temperature rises above the normal or predetermined value, the galvanometer pointer 3 will shift to the right in Figure 1 and the contacts 10 and 15 will be closed as the bar moves downward. Under these conditions the closing coil 72 of the switch 70' will be energized through a circuit from the power lead 61, conductors 59, 81', contacts 10 and 15 and conductor 80, coil 72, conductor 79, the circuit closing members 78 and 77 to the power lead 62. This will close blades 66 and 67 of the switch 70' and will connect the lead 64 of motor 46 to the power supply lead 63 and will connect the lead 65 to the power supply lead 62. Motor 46 will rotate in the reverse direction and will cause turning of the control spindle 52 in a direction to reduce the fuel supply and cause a lowering of the temperature at the thermocouples and at the same time the contact table 13 will be moved to the right. The closure of the switch 70' interrupts the energizing circuit for the closing coil 72 by the movement of the circuit closing member 77 to the right. The cam 28 will operate to close the switch 29 as above set forth, and an energizing circuit will be completed through opening coil 73 of the switch 70', from the power lead 61 conductors 59 and 83, coil 73, conductor 82' to the switch blade 66 and power lead 63. Opening of the switch 70' will interrupt the energizing current and the power supply to the motor 46 and the parts will come to rest. As the rotation of the shaft 26 continues escapement member 37 will be reciprocated under the influence of the cam 30 and the contact table will return to normal under the influence of spring 18 a step at a time in the manner above set forth.

The operation and proportioning of parts is preferably such that for each degree of deviation of the temperature from the normal or predetermined value, one step of the apparatus will be taken. On the form shown the steps are all of equal length but by utilizing well known control galvanometers of the form in which the time the contacts are closed depends upon the amount of deflection, the steps may be made proportional in length or interval to the amount of deflection of the pointer from the position between contact springs 7 and 8. Preferably the arrangement is such that a slight over correction is made in the heat supply so that the return of the galvanometer pointer to normal is faster than the rate of return of the contact table to normal. In this case as the temperature approaches normal after a deviation the fuel supply may be regulated to decrease the rate of temperature change so that as normal or predetermined conditions are reached, the tendency for the temperature to continue changing beyond normal is reduced to a minimum and the fuel or heat supply is adjusted to maintain substantially normal conditions. In this way a temperature control is provided for gas, electric or oil furnaces in which a compensation for lag of temperature recovery behind the fuel supply may be provided, and in which the control is independent of the position of the fuel controlling valves or switches. It will also be noted that the correction of the fuel supply is arrested before the temperature conditions reach normal and that the adjustment steps may be made rapidly without danger of material over-corrections.

Where the fuel comprises commercial gas wide variations in gas quality which cause sudden variations of the temperature conditions in the furnaces or kilns frequently occur. To compensate for variations in gas quality before substantial variations in temperatures can occur the form of apparatus shown in Figure 2 has been devised. In this arrangement the table 13 of the control galvanometer shown in Fig. 1 is fixed instead of movable and the escapement controls are accordingly eliminated. Otherwise the galvanometer together with the control for the motor 46 is the same as above set forth. Like parts have been given the same reference characters as corresponding parts in Fig. 1, to the description of which reference may be had for a full understanding thereof. The mechanism driven by motor 46 is altered by substituting for the escapement drive, the following parts. Mounted on one end of the shaft 48 is a worm 88 which drives a gear 89. Worm gear 89 drives a suitably journaled spindle 90 upon which the arm 91 is rigidly secured. Supported on the end of the arm 91 is a differential thermocouple 92 provided with the junction points 93 and 94 which are adapted to be held in flame 95 of a control burner through which gas is supplied from the furnace supply mains. The thermocouple 92 is connected by the leads 53 and 54 to the galvanometer coil 1.

Figure 4:
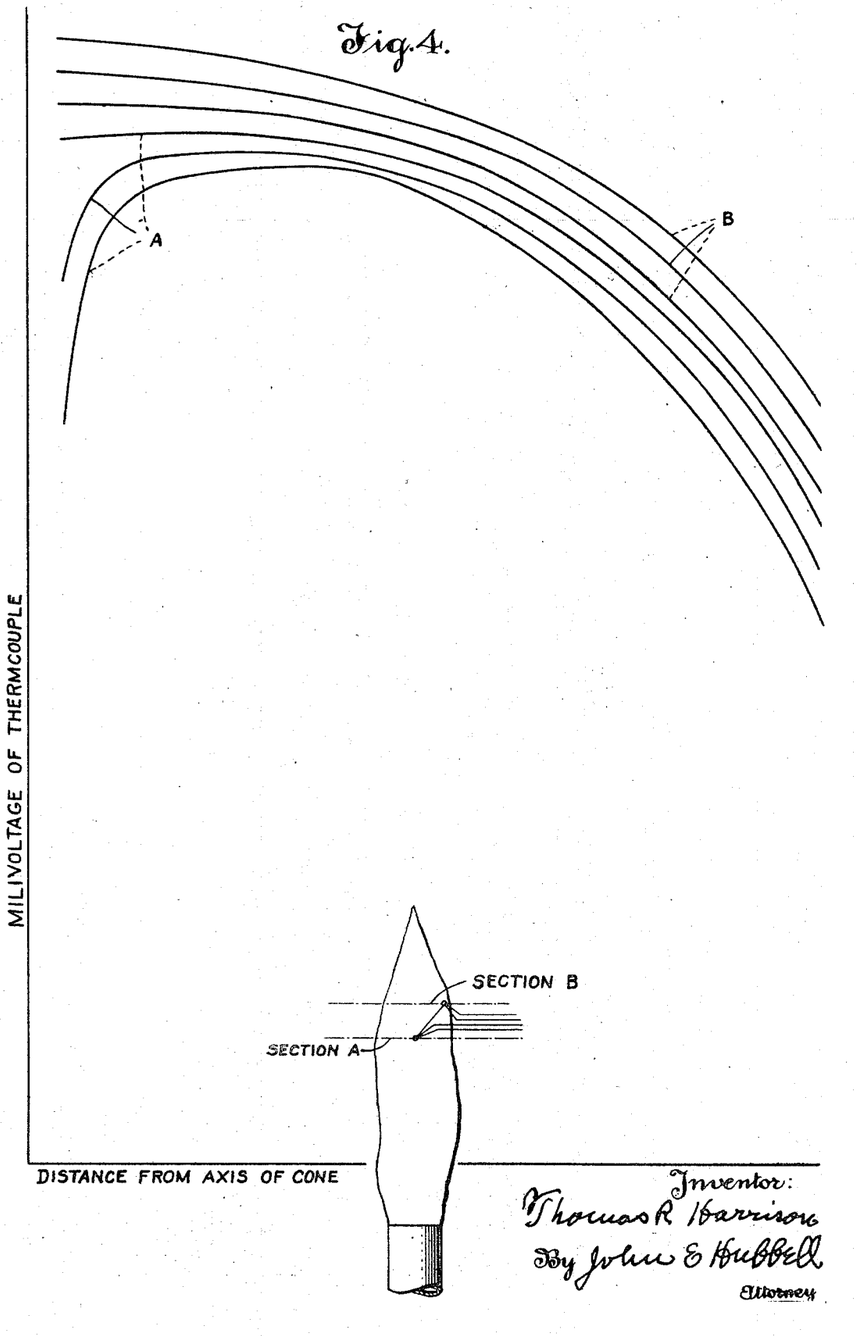
Fig. 4 is a diagrammatic showing of a Bunsen flame and the temperature gradients associated therewith.

Fig. 4 of the drawings illustrates the mode of operation of the device for measuring flame characteristics, the Bunsen flame being shown and curves representing the temperature gradients within the flame for three flame conditions being illustrated. One of the thermocouples within the flame is preferably positioned at the tip of the inner cone, the other thermocouple being positioned somewhat above and removed from the inner cone although it lies within the body of the flame. Section lines through the cone illustrate the sections through which the temperature gradients are taken as represented by the curves of temperature gradients. Curve A corresponds to the section A, and the two curves, one on each side of curve A, represent temperature gradients in the same plane when the flame is slightly increased or slightly decreased in size due to any cause whatever. The curve next above curve A represents a temperature gradient in the plane of section A when the flame has decreased somewhat in size, while the curve next below curve A represents a temperature gradient along section A when the flame has increased slightly in size.

The curve B corresponding to section B represents a temperature gradient along that section for the flame size shown. The curve next above curve B represents the temperature gradient along section B when the flame has slightly increased in size, and the curve next below curve B represents the temperature gradient along section B when the flame has slightly decreased in size.

It will be noted that a change in flame size causes a change in thermocouple temperature in thermocouple A which is the direct opposite to the change of thermocouple temperature in the thermocouple located in section B. This is due to the fact that thermocouple A is located at a critical point in the flame where an increase in flame size involves a sudden drop of temperature due to the fact that the thermocouple located in section A passes through the surface of initial combustion into the cooler gases within the inner cone. On the other hand when the flame decreases in size the thermocouple located in section A is moved into a zone just above the tip of the cone which represents the hottest portion of the flame.

The changes in temperature of thermocouple located in section B and changes in flame size will be understood when it is considered that with an increase in flame size the thermocouple will be buried more deeply into the body of the flame and therefore its temperature will be increased, while on the other hand when the flame decreases in size the thermocouple will approach or even pass beyond the outer fringe of the flame and therefore drop in temperature.

The thermocouples are positioned in section A and section B such that the thermocouple in section A measures the temperature corresponding to the left end of the curve A, while the thermocouple located in section B is so positioned that it takes up a like temperature on the curve B. Thus with changes in flame size, or shape, or generically speaking, changes in flame structure, the temperature of the thermocouple in section A will be either increased or decreased, while with the corresponding change in flame structure the temperature of the thermocouple in section B will be either decreased or increased, so that a difference in temperature between the thermocouples in section A and section B will be created, the direction of the temperature gradient corresponding to the direction of change in flame structure. Thus, if the flame increases in size the temperature of the thermocouple in section A will fall and the temperature of the thermocouple in section B will rise thereby causing an electrical current to flow from the thermocouple in section B to that in section A, and so through the electrical measuring circuit. On the other hand if the flame should decrease in size, the temperature of the thermocouple in section A will rise while that of the thermocouple in section B will fall so that a differential electromotive force causing a current flow from the thermocouple of section A to that of section B will be created. Thus it is seen that by so positioning the thermocouples in the flame they will operate to measure changes in flame structure.

Obviously the flame may be controlled to a constant size, or the flame may be allowed to vary in size and the thermocouples caused to follow the movement of the flame so as to always retain the same relative position with respect to the flame. Furthermore, it is obvious that other positions in the flame may be selected for the thermocouples which will involve a like set of critical conditions so that the thermocouples will respond to changes in flame structure. Thus the thermocouple in section A might be located on any portion of the inner cone with the thermocouple of section B in any of several points in the body of the flame.

As is apparent from the above described operation of the flame structure measuring device, the change in temperature of the thermocouple at the tip of the inner cone has a predominating effect, the change of temperature of the thermocouple of section B being of small extent. It is obvious, therefore, that a single thermocouple located at the tip of the cone or along other portions of the inner cone, without the second thermocouple in the flame, may be employed to measure changes in flame structure and thereby control the flame to a constant length or measure changes in size of the flame. The essential reason for introducing the additional thermocouple in the flame is that the cold and hot junctions of the thermal electric circuit will be subjected to the same deteriorating effects. Obviously, therefore, a thermocouple arranged to measure the temperature at or adjacent the tip of the inner cone is an equivalent for the structure herein specifically disclosed.

In addition, it is obvious that instead of selecting points within the flame such that the thermocouples will both be at the same temperature in normal operating conditions, points may be selected such that the thermocouples will have a predetermined difference of temperature. The only advantage in having the two thermocouples normally at the same temperature is that null type of measuring system may be employed.

The above description refers to temperatures within the flame, however, the temperatures are those measured by thermocouples positioned within the flame and accordingly are subject to temperature effects due to conduction of heat along the thermocouple wire. The curves representative of the temperature gradient within the flame are in fact millivoltage curves for the thermocouples so positioned within the flame, the conduction effects being present.

While the above theory of operation is set forth in order to enable a more complete understanding of the invention and to provide accurate terminology for describing the invention, it is not intended to limit the invention to the particular theory of operation herein set forth inasmuch as the fact that the thermocouples, arranged in the flame as disclosed, do measure changes in flame structure regardless of the theory of operation thereof.

Figure 2:
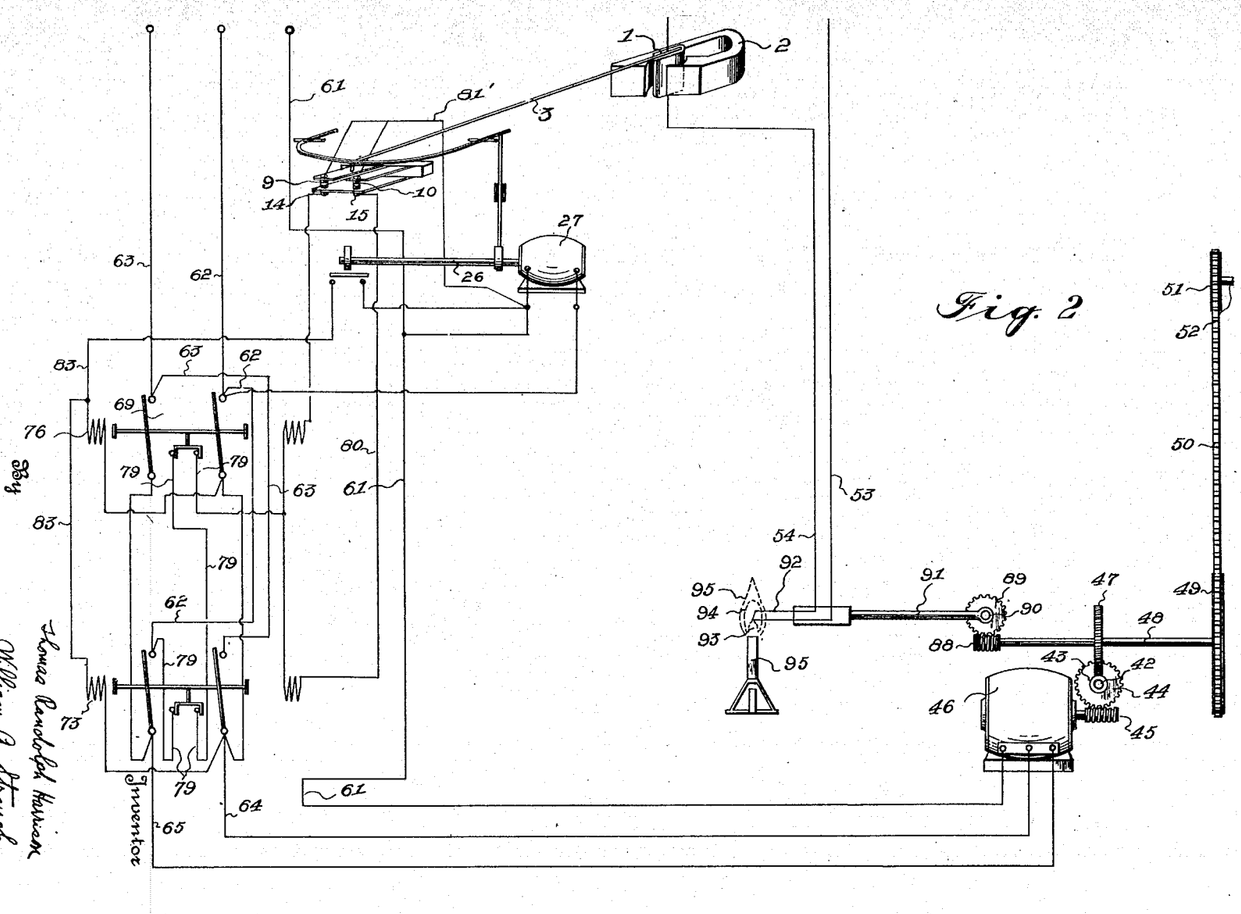
Figure 2 is a diagrammatic representation of a form of control in accordance with the variations in quality of a fuel supply.

In operation, when the supply of fuel is proper for the particular quality of gas the parts will be at rest with the points 93 and 94 of the couple 92 in the inner and outer flame zones and preferably at equal temperatures and with the galvanometer pointer 3 in normal or zero position. Control spindle 52 will position the furnace supply valves accordingly, to maintain the proper fuel supply. When the gas quality varies, the flame 95 will vary in length and a current will be set up in the thermocouple 92 due to the change in relative temperatures of the points 93 and 94. This current will cause a deflection of the galvanometer needle or pointer 3, and as the depressor bar moves downward, one or the other of the contacts 9 and 10 will be moved into engagement with its corresponding contact 14 or 15 causing switch 70 or 70′ to close. Closing of the switch will cause rotation of the motor 46 in a direction to regulate the fuel supply through spindle 52, and at the same time the thermocouple 92 will be raised or lowered in accordance with the nature of the correction. The correcting steps will continue until the proper relative temperatures of the points 93 and 94 are reached, at which time the pointer of the galvanometer will be restored to its normal or zero position. The timing of movements and proportioning of parts are preferably made such that the fuel supply is varied to maintain uniform temperature conditions in the furnace as the gas quality varies.

Figure 3:
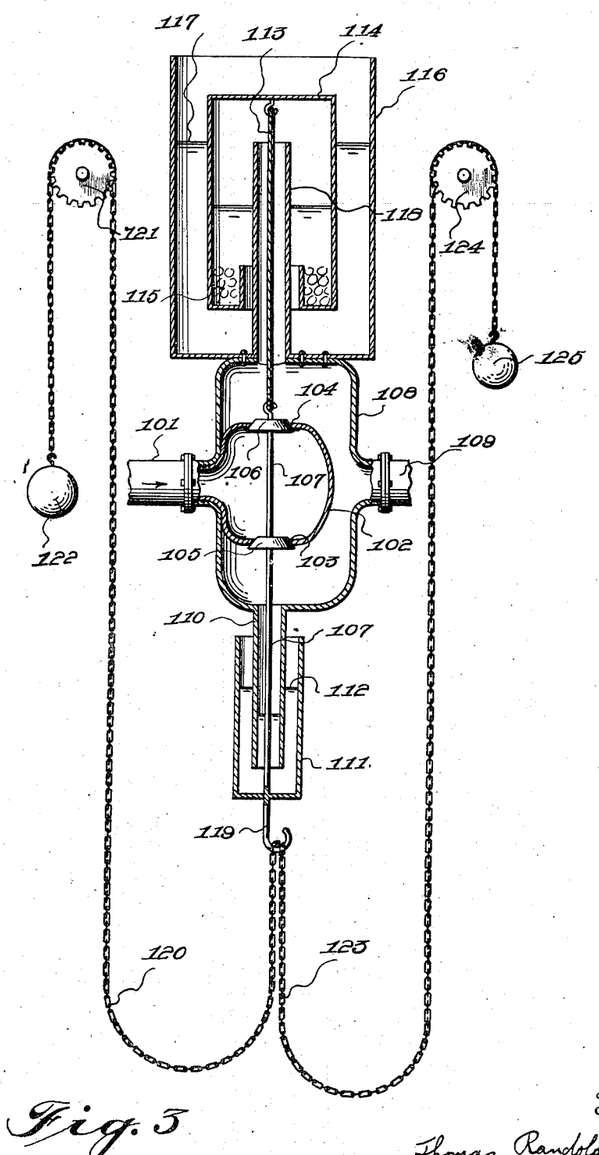
Figure 3 is an illustration, more or less diagrammatic, showing the valve construction adapted to control gas pressures under the joint action of a plurality of control devices.

When temperature variations in a furnace or kiln occur due to causes independent of variations in quality of fuel supply the controls shown in Figs. 1 and 2 may be applied and maintain proper temperature conditions. This may be effected by controlling a fuel supply through separate valves in series in the fuel line in obvious manner or through a single control valve. A preferred form of single control valve for effecting this type of joint control is shown in Figure 3. The gas or fuel supply for the furnace or kiln is admitted through a pipe 101 into an inlet valve body section 102 provided with outlet valve seats 103 and 104. A pair of valves 105 and 106 secured to a member 107 to seat against the valve seats 103 and 104 and to control the admission of the fuel supply passing to the burners through the valve outlet section 108 and burner supply pipe 109. The lower end of member 107 extends below the valve member 105 through a sealing extension 110 of section 108 and has secured to its lower end a sealing cup member 111. A sealing liquid such as mercury provided in cup 111 prevents escape of gas through member 110. The upper end of member 107 is secured by means of a connection 113 to an inverted gas bell or chamber 114 which is provided with suitable balancing weights 115 and is adapted to float in tank 116 in which the sealing water 117 is provided. Extending through the tank 116 into the bell 114 is gas connection 118 from the outlet section 108 of the valve. Secured to a projection 119 of the sealing cup member 111 is a weighting chain 120 which passes over a control sprocket 121 and is provided at its end with a weight 122. A second weighting chain 123 connected to the member 119 is passed over control sprocket 124 and is provided at its end with a weight 125. If desired the end sections of the chains 120 and 123 which ride over the sprockets 121 and 124 may be made one-fourth as heavy as the remainder of the chain. The proportions will then be such that the weight of chain on opposite sides of the sprockets will be substantially balanced in the various operating positions of the sprockets.

In operation of the valve, gas pressure in the outlet section 108 of the valve passes upward through 118 into the bell 114 and when this pressure is sufficient to raise the member 107 together with the weight of the chains 120 and 123 the members 105 and 106 will cut off the gas supply from the feed. As soon as the gas pressure in 107 is decreased the bell 114 will lower, and the valve members 105 and 106 will move away from the seats 103 and 104 permitting gas under pressure from section 102 to enter the section 108 until the pressure in the bell is again sufficient to raise 107 and close the valves. In this way it will be seen that the pressure of the gas fed to the burner will be maintained substantially uniform and at values controlled by the weight of chain depending from 119. The sprockets 121 and 124 may be driven by the spindles 52 of the arrangements shown in Figs. 1 and 2 and the gas pressure fed to the burner will accordingly be varied simultaneously in accordance with changes in the quality of the fuel supply and in accordance with temperature variations due to other causes. By eliminating one of the chains 120 or 123 and the corresponding parts, the fuel pressures may be controlled solely in accordance with the gas quality or the temperature variations. The method of controlling heat energy supply by means of the weight of chains may in obvious manner be applied to oil valves, control rheostats for electrical heating arrangements; the various known diaphragm and spring controlled pressure regulators, and like valves and switches; by causing the weights to balance against the spring diaphragm or pressure actuated control members to regulate the position or adjustment thereof.

In cases where it is desired to control a single operating spindle in accordance with both the quality of the fuel supply and the temperature variations, the forms shown in Figs. 1 and 2 may be modified so that a single motor 46 alternately drives the escapement mechanism and movable contact table of the temperature control galvanometer of Figure 1 and the differential thermocouple of Figure 2. Suitable switch arrangements may be operated in obvious manner to alternately connect the leads 61, 80, and 81 alternately to the galvanometers and suitable clutching means may be simultaneously operated with the switching mechanism to alternately drive the escapement mechanism and the differential thermocouple.

While the forms disclosed in Figs. 1 and 2 have been shown controlling alternating current reversing motors, it will be understood that direct current reversing motors or any other suitable mechanisms for reversing rotation of a shaft such as the well known Englehardt regulator may be controlled by the galvanometer contacts in obvious manner to those skilled in the art. This form of my invention has been described in the February and March numbers, 1924, of the magazine "Fuels and Furnaces".

The form disclosed in Figure 2 has been shown and described as applied to a regulating system for the control of temperatures in accordance with variations in gas quality but it will be obvious that the arrangement may be applied to various other uses. The pointer 3 may obviously be controlled by physical changes other than temperature changes due to flame variations of a fuel supply. For example pressure or other temperature changes from which it is desired to vary a fuel supply of heating energy may be utilized. Instead of regulating the gas supply through a valve or regulating the pressures of gases fed to the burners, the arrangement may be applied to control the amount of air mixed with fuel gases under the control of the flame variations to maintain predetermined conditions and the arrangement may obviously be applied to the conditioning of a gas supply by maintaining a uniform quality. Such uniformity of quality may be maintained, for example, by conditioning a supply of city gas with oil. By fixing the thermocouple 92 with relation to the burner 95 an arrangement may be provided for regulating the flame length produced by a gas supply which varies in quality. Regulation of the flame length may be carried out by controlling a mixture of different kinds of fuel gas, conditioning the gas with oil, by regulating the air supply as the quality varies, and in various other ways.

The valve sprockets 121 and 124 may obviously be controlled in accordance with pressures, temperatures or other physical conditions, which may be either qualities of the material, energy or operation controlled by the valve or switch, or which may directly or indirectly affect the operations controlled by the valve or switch. As many control sprockets or chains may be applied to the valve switch or other control unit as there are variable conditions from which it is desired to control.

Numerous uses of the apparatus herein set forth will suggest themselves to those skilled in the art. The temperature and fuel quality control may be applied independently of each other, simultaneously, or alternately to maintain uniform conditions. Accordingly it will be seen that wide variations of the invention and its application to various uses will suggest themselves to those skilled in the art. The expression "stationary flame" used in some of the appended claims is intended to designate a flame definitely positioned in any given operating condition, as, for example, a Bunsen burner flame is positioned relative to the burner outlet, and to distinguish from such a flame condition, for example, as exists above the fuel grate in a combustion chamber in which the flames formed by the combustion of gaseous bodies arising from the fuel bed vary in position with the movements of said bodies.

Having described preferred embodiments of the invention, what is desired to be secured by Letters Patent and claimed as new is:

1. In a temperature control system, a device to be maintained at a predetermined temperature and a fuel supply therefor, the quality of which is normally in a predetermined condition, a burner connected to said fuel supply and producing a gas flame in accordance with the quality of fuel in said fuel supply, a thermo-couple disposed in said flame so as to measure a temperature indicative of flame structure, a galvanometer connected to said thermo-couple variably operated in accordance with variations of temperature in said flame to which said thermo-couple is responsive, said galvanometer including a pointer deflecting in accordance with the variations in operation of said galvanometer, an electric circuit, means controlled by said pointer when in a deflected position for variably operating said circuit, a motor in said electric circuit and variably operated in either direction in accordance with the operation of said circuit by said deflected pointer, a valve in said fuel supply and means controlled by said motor for variably operating said valve to vary said fuel supply.

2. In combination, a fuel supply, a burner connected to said fuel supply, another burner connected to said fuel supply, a thermo-couple disposed in the flame of said first burner so as to measure a temperature indicative of flame structure, a galvanometer connected to said thermo-couple and means controlled by said galvanometer for varying said fuel supply to said other burner.

3. In combination, a source of fuel supply, a burner connected to said fuel supply having a cone of a predetermined length, a device in said flame responsive to variations in length of said cone, a controller operatively connected to said device and means controlled by said controller and responsive to the variations in length of said cone for varying said fuel supply for maintaining said cone at a predetermined length.

4. In combination, a burner having a flame with a cone of a predetermined length and a temperature responsive means in said cone, a controller operatively connected to said temperature responsive means and a motor means variably operated by said temperature responsive means in accordance with the variations of said controller by said temperature responsive means.

5. In combination, a flame, a source of fuel supply for said flame, a thermo-couple disposed in said flame and measuring variations in length thereof, a controller, means for operating said controller periodically, means whereby said thermo-couple variably operates said controller and means controlled by said controller for maintaining said flame at a predetermined length.

6. In combination, a burner having means disposed in said flame and measuring variations in the length of said flame, a controller operatively connected to said last mentioned means and means operatively connected to said controller for varying the length of said flame in accordance with the variations thereof for maintaining the flame at a predetermined length.

7. In combination, a burner, means responsive to variations in the length of said flame inserted in said flame, a galvanometer connected to said length responsive means, said galvanometer having a pointer deflected in accordance with the variations of said length responsive means, a pair of contacts, electrical circuits extending from each of said contacts, periodic means co-acting with said pointer in deflected position for selectively closing said contacts, a motor connected in said electrical circuits and operated in either direction in accordance with the contacts closed, means controlled by said motor for varying the position of said temperature responsive means in said flame and means controlled by said motor for varying the length of said flame to maintain said flame at a predetermined length.

8. In a temperature control system, a device to be maintained at a predetermined temperature and a fuel supply therefor, the quality of which is normally in a predetermined condition, a burner connected to said fuel supply and producing a gas flame in accordance with the quality of fuel in said fuel supply, a thermo couple in said flame, a galvanometer connected to said thermo couple variably operated in accordance with variations of temperature in said flame to which said thermo-couple is responsive, said galvanometer including a pointer deflecting in accordance with the variations in operation of said galvanometer, an electric circuit, means controlled by said pointer when in a deflected position for variably operating said circuit, a motor in said electric circuit and variably operated in either direction in accordance with the operation of said circuit by said deflected pointer, a valve in said fuel supply, means controlled by said motor for variably operating said valve to vary said fuel supply and means being controlled by said motor for moving said thermo couple in said flame in accordance with the operation of said motor.

9. In combination, a device to be maintained at a predetermined temperature, a source of fuel supply therefor, a gas flame controlled by said source of fuel supply, a galvanometer, a thermo-couple disposed in said gas flame and measuring structural variations of said gas flame for variably operating said galvanometer and means controlled by said galvanometer for controlling said fuel supply.

10. In combination, a device to be maintained at a predetermined temperature, a source of fuel supply therefor, a gas flame controlled by said source of fuel supply, a control device, a thermo-couple disposed in said flame and measuring structural variations of said gas flame for variably operating said control device and means controlled by said control device for controlling said fuel supply.

11. In combination, a plurality of burners, a source of fuel supply for said burners, a thermo-couple disposed in the flame of one of said burners, control mechanism electrically connected to said thermo-couple and variably operated in accordance with the variations in temperature of said temperature responsive means and means controlled by said control mechanism for varying the fuel supply to said other burners.

12. In combination, a source of fuel supply, a burner disposed to said fuel supply, a thermo couple connected in the flame of said burner so as to measure variations in flame structure, control mechanism connected to said thermo couple and means controlled by said control mechanism for varying the fuel supply.

13. In combination, a fuel supply, a burner connected to said fuel supply, a differential thermo-couple disposed in the flame of said burner whereby variations in the flame due to variations in the quality of the fuel supplied to said burner will vary the difference of potential between the junctions of said thermo-couple and means controlled by said thermo-couple for controlling said fuel supply.

14. In combination, a fuel supply, a burner connected to said fuel supply, a thermo-couple disposed in the flame of said burner and means controlled by said thermo-couple for moving said thermo-couple with respect to said flame.

15. In combination, a device to be maintained at a predetermined temperature, a source of fuel supply therefor, a gas flame controlled by said source of fuel supply, a control device, a thermo-couple disposed in said flame and responsive to the structure variations of said gas flame for variably operating said control device and means controlled by said control device for controlling the B. t. u. supplied to said first mentioned device.

16. A device for measuring the heating effect of a combustible fluid which comprises a burner for burning a portion of the fluid as a stationary flame, a temperature responsive means in the flame for measuring structure of the flame.

17. A device for determining the characteristics of a combustible fluid which comprises a burner for burning the fluid as a stationary flame, and thermocouples differentially connected in said flame responsive to a temperature distribution in the flame indicative of the flame structure.

18. The method of controlling a fuel supply which comprises; burning a sample of the fuel as a stationary flame, measuring a flame temperature distribution which is indicative of the flame structure, and adjusting the fuel supply in accordance with variations in the flame structure.

19. In apparatus for measuring the heating effect of burning fluid fuel the combination of; means for burning a sample of the fluid as a stationary flame, electrical temperature responsive device positioned within said flame and means associating said device so as to respond to variations in the structure of said flame.

20. In combination, a source of fuel supply, a burner connected to said fuel supply, another burner connected to said fuel supply, temperature responsive means disposed in the flame of said first burner so as to measure a temperature indicative of flame structure and means controlled by said thermocouple for varying said fuel supply to said other burner.

21. The method of measuring the heating effect of a fuel which comprises; burning a portion of the fuel as a stationary flame and measuring a flame temperature effect dependent upon the temperatures of portions of the flame between which differences in temperature are created by changes in the structure of the flame.

22. In apparatus for measuring the heating effect of a fuel, the combination of means for burning a portion of the fuel as a stationary flame, and means for measuring a flame temperature effect indicative of flame structure comprising temperature responsive means in contact with portions of the flame between which differences in temperature are created by changes in flame structure.

23. Apparatus for automatically controlling the heating effect derived from the combustion of fluid fuel which comprises; burner means for burning a sample portion of the fuel as a stationary flame, means for adjusting the supply of a constituent of the fuel, and means for measuring the structure of the flame and controlling said adjusting means in accordance with variations in said structure.

In testimony whereof I affix my signature.

THOMAS RANDOLPH HARRISON.

CERTIFICATE OF CORRECTION.

Patent No. 1,863,373.                                                                                         June 14, 1932.

THOMAS RANDOLPH HARRISON.

It is hereby certified that error appears in the printed specification of the above numbered patent requiring correction as follows: Page 9, line 49, claim 6, strike out the word "having"; page 9, line 130 and page 10, line 1, claim 11, strike out the words "temperature of said temperature responsive means" and insert instead flame structure; and that the said Letters Patent should be read with these corrections therein that the same may conform to the record of the case in the Patent Office.

Signed and sealed this 4th day of October, A. D. 1932.

M. J. Moore,
(Seal)                                                                          Acting Commissioner of Patents.